June 16, 1931.  L. D. ALBERTSON  1,810,587
GRASS TRIMMER
Filed Dec. 8, 1928   2 Sheets-Sheet 1
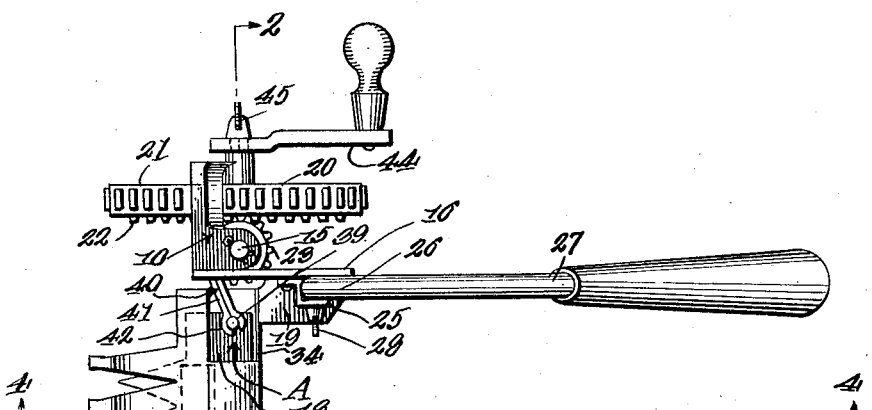

June 16, 1931.  L. D. ALBERTSON  1,810,587
GRASS TRIMMER
Filed Dec. 8, 1928    2 Sheets-Sheet 2
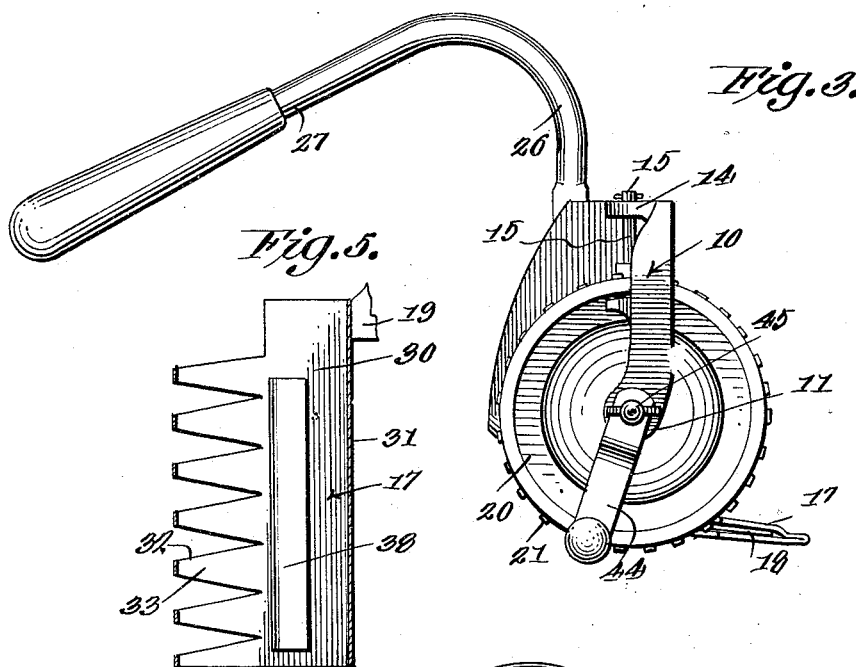
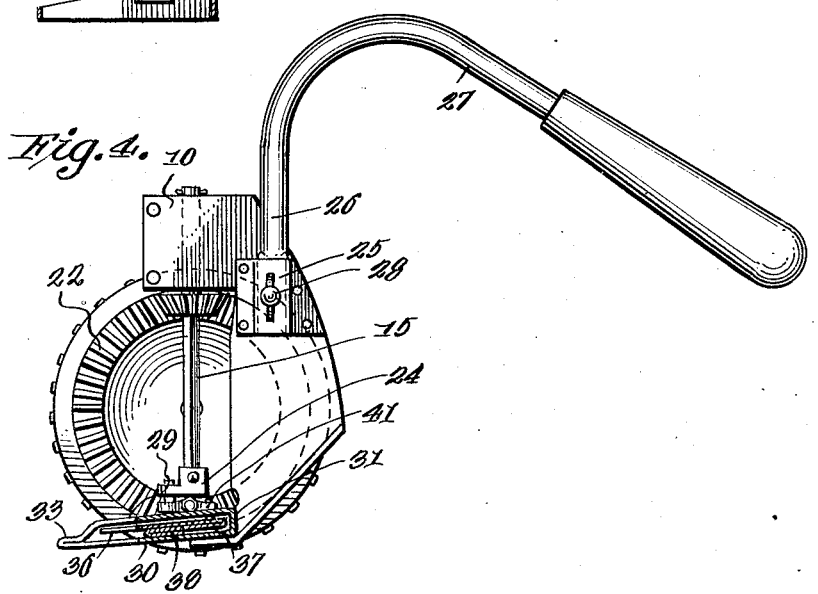
WITNESS
INVENTOR.
LUTHER D. ALBERTSON
BY
ATTORNEY.

Patented June 16, 1931

1,810,587

UNITED STATES PATENT OFFICE

LUTHER D. ALBERTSON, OF CORYDON, INDIANA, ASSIGNOR OF ONE-FOURTH TO JOHN W. DAVIDSON, ONE-FOURTH TO EMMETT BEANBLOSSOM, ONE-FOURTH TO ALBERT STOVER, ONE-SIXTEENTH TO GEORGE C. SIMLER, THREE THIRTY-SECONDS TO OLIVER W. HOTTEL, AND THREE THIRTY-SECONDS TO CECIL W. MILES, ALL OF CORYDON, INDIANA

GRASS TRIMMER

Application filed December 8, 1928. Serial No. 324,723.

This invention appertains to devices for trimming hedges, the borders of lawns, and the like, and has for one of its primary objects the provision of a light portable hand implement which can be successfully used both for the purpose of trimming edges or borders of lawns and for trimming hedges and which embodies a reciprocating cutter bar and novel means for operating said bar either by hand or by the moving of the cutter over the edge of the lawn to be trimmed.

Another salient feature of the invention is the provision of novel means for supporting the operative parts of the cutter from a single frame casting, said operative parts embodying a single drive shaft with means for operating the shaft either by hand or from a ground wheel.

A further object of the invention is the provision of means for associating detachable handles with the frame casting whereby either a short handle can be associated with the frame when the device is being used for trimming hedges or a long handle can be associated with the frame when trimming the edges of lawns.

A further object of the invention is the provision of a novel cutter bar with novel means for supporting the cutter bar and a novel mechanism for operating said cutter bar.

A still further object of the invention is to provide a hedge trimmer and a lawn border trimmer of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:—

Figure 1 is a top plan view of the improved cutter.

Figure 2 is a vertical section taken on the line 2—2 of Figure 1 looking in the direction of the arrows.

Figure 3 is a side elevation of the improved cutter showing the hedge trimming handle associated therewith and the crank for actuating the operating mechanism by hand.

Figure 4 is a vertical section taken on the line 4—4 of Figure 1 looking in the direction of the arrows.

Figure 5 is a horizontal sectional view through the cutter bar or guide for the reciprocating knife, and Figure 6 is a bottom plan view of the cutter knife.

Referring now to the drawings in detail, wherein similar reference characters designate corresponding parts throughout the several views, the letter A generally indicates the improved combined hedge trimmer and lawn border cutter which comprises a main frame casting 10 having a bearing 11 on the lower end thereof for rotatably supporting the main drive shaft 12. The upper end of the main frame casting is provided with a lateral extension 13, which supports a vertical bearing 14 for the vertical operating shaft 15. The casting 10 may have secured to the bearing 14 or formed thereon a depending frame bar 16 for supporting the cutter guard and guide 17 for the reciprocating knife bar 18. By referring to Figures 1, 2 and 4, it is to be noted that the frame bar 16 is provided with a lateral extension 19 for strengthening said frame bar and for also forming additional means for supporting the cutter guard and guide 17, which will be hereinafter more specifically described.

The drive shaft 12 in the nature of a stub shaft and has keyed or otherwise secured thereto the ground wheel 20, the periphery of which can be serrated or provided with teeth 21, so as to insure the proper traction of the wheel when the device is moved over the ground. This ground wheel 20 has the annular row of gear teeth 22 projecting from one face thereof and thus this gear is in the nature of a crown gear and the teeth 22 have meshing therewith a beveled pinion 23, which is keyed or otherwise secured to the vertical shaft 15. The shaft 15 forms the means for driving the reciprocating knife bar 18 and the lower end of this shaft has secured thereto an operating crank 24.

Secured to the side face of the frame bar 16 adjacent to the upper end thereof is a socket 25 for receiving the shank 26 of a manipulating handle 27. The inner end of the shank 26 of the manipulating handle 27 is preferably of polygonal shape in cross section to conform to the cross section configuration of the socket 25 and the shank is held against accidental displacement by the use of a thumb screw 28. The handle 27 in the present instance is of a relatively small size so as to permit the use of the implement for trimming hedges and the like and this handle curves rearwardly and downwardly from the shank as clearly shown in Figure 3 of the drawings.

It is to be understood that the handle 27 can be readily removed from the cutting device and a relatively long handle associated therewith, so as to permit the device to be conveniently moved over the ground for the trimming of the borders of lawns.

Referring to the cutter guard 17, it is to be noted that the same forms a substantially closed housing for the cutter knife or bar 18 and this cutterguard 17 includes upper and lower plate sections 29 and 30 which can be joined at their rear edges by a suitable rear wall 31. The forward edges of the plates can be secured together and provided with V-shaped notches 32 for forming guard teeth 33. Referring more particularly to Figure 1, it can be seen that the top plate 29 adjacent to its inner end is cut away as at 34 for a purpose which will be later described. The guard 17 projects laterally from the frame bar 16 and the handle 27 extends rearwardly therefrom.

The cutter knife or bar 18 includes a back plate 35 having forwardly projecting V-shaped cutting teeth 36 the edges of which are sharpened for co-action with the guard teeth 33 so as to bring about the successful cutting of the grass or hedge as the case may be.

The back plate 35 can be folded back upon itself to provide a strengthening rib 37 and the forward edge of this rib 37 is adapted to slidably engage a guide bar 38 carried by the lower wall 30 and this guide bar 38 forms an efficient means for guiding the cutting blade during its reciprocation, it being noted at this point that the V-shaped cutter teeth 36 ride between the cutter guard teeth 33. The inner end of the backplate 35 of the cutter knife 18 is provided with an upstanding pin 39 and the crank 24 is connected to the pin 39 by the use of a pitman 40.

The pitman 40 preferably includes a pair of companion sections 41 having the opposite ends provided with jaws 42 for gripping engagement with the crank and pin 39 and these jaws are maintained in engagement with the crank and pin 39 by the use of a suitable nut and bolt 43.

As stated the actuating shaft 15 can be driven from the ground wheel 20 when the device is moved over a lawn and means is provided for driving this wheel by hand when the device is being used for trimming hedges and this means includes a hand crank 44 which is slipped over the polygonal end of the drive shaft 12. The crank can be held in place by a thumb screw 45 or the like so that the crank will be prevented from displacement during the manipulation thereof.

When the device is being used for trimming hedges the short handle is used and the handle is held in the left hand of the operator and the crank is turned by the right hand. The cutter bar and guard is now moved over the hedge. Upon the turning of the crank 44 the cutter bar 18 will be reciprocated thus bringing about the cutting action and the trimming of the hedge.

When it is desired to use the device for trimming the borders of lawns a relatively long handle is associated with the socket 25 and the hand crank 44 can be removed if desired. The cutter guard bar is placed on the lawn border with the ground wheel in engagement with the ground after which the device is pushed over the lawn and the rotation of the ground wheel will bring about the reciprocation of the cutter knife and the consequent trimming of the lawn.

From the foregoing description, it can be seen that I have provided an exceptionally simple and durable hedge and lawn border trimmer which is of a light portable character and which can be conveniently manipulated by the user thereof.

Changes in details may be made without departing from the spirit or scope of the invention, but what I claim as new is:—

1. A combined lawn border and hedge trimmer comprising a supporting frame, a cutter bar, a drive stub shaft rotatably carried by the frame, a ground traction wheel secured to said shaft, a crown gear formed on one face of said traction wheel, a vertical actuating shaft rotatably carried by said frame, a pinion keyed to said actuating shaft cooperating with the crown gear, and a crank and pitman connection between said actuating shaft and cutter bar.

2. A combined lawn border and hedge trimmer comprising a supporting frame, a cutter guard, a reciprocating knife bar carried by the cutter guard, a ground traction wheel, means for actuating the cutter bar from said ground traction wheel, a handle detachably connected to the frame, said cutter guard including top and bottom plates, a rear wall connecting the rear edges of said plates together, the forward edges of said plate being secured together, inwardly directed V-shaped notches defining guard teeth, said knife bar being received between the top and bottom plates which form a complete housing therefor.

In testimony whereof I affix my signature.

LUTHER D. ALBERTSON.